United States Patent [19]

Draper et al.

[11] Patent Number: 4,664,986
[45] Date of Patent: May 12, 1987

[54] HIGH THERMAL CONDUCTIVITY GAS FEEDER SYSTEM

[75] Inventors: Robert Draper; William E. Young, both of Churchill Borough; Francis R. Spurrier, Pittsburgh; James A. Dilmore, Irwin, all of Pa.

[73] Assignee: Westinghouse Electric Corp., Pittsburgh, Pa.

[21] Appl. No.: 852,871

[22] Filed: Apr. 16, 1986

[51] Int. Cl.[4] .......................... H01M 8/02; H01M 8/12
[52] U.S. Cl. ........................................ 429/26; 429/31; 429/35
[58] Field of Search ................... 429/17, 19, 31, 33, 429/38, 39, 26, 34, 35, 36

[56] References Cited

U.S. PATENT DOCUMENTS

| 4,374,184 | 2/1983 | Somers et al. | 429/31 |
| 4,395,468 | 7/1983 | Isenberg | 429/31 |
| 4,520,082 | 5/1985 | Makiel | 429/31 |

OTHER PUBLICATIONS

Metals Progress, 1985, Materials and Processing Databook, Vd. 128 No. 1, mid-Jun. 1985, pp. 60-62.

Primary Examiner—Donald L. Walton
Attorney, Agent, or Firm—Daniel P. Cillo

[57] ABSTRACT

A fuel cell generator is made, containing fuel cells, a fuel inlet, and an oxidant manifold feed system containing a plurality of conduits which extend into the fuel cells, where the manifold system and conduits contain thermally conducting material resistant to oxidizing gas, and where no oxidant passes into the interior of the generator before passage into the fuel cells.

23 Claims, 9 Drawing Figures

HIGH THERMAL CONDUCTIVITY GAS FEEDER SYSTEM

BACKGROUND OF THE INVENTION

High temperature, solid oxide electrolyte fuel cell generators, which are made of mostly ceramic components, and which allow controlled leakage among plural chambers in a sealed housing, are well known in the art, and taught by Isenberg, in U.S. Pat. No. 4,395,468. Referring to the Drawings, one type of such prior art design is shown in FIGS. 1 and 2, where exterior, gastight housing 12 sealingly surrounds three chambers which communicate among one another through controlled gas seepage within the fuel cell generator 10.

The housing 12 surrounds a fuel inlet or generating chamber 14, a combustion product or preheating chamber 16, and an oxidant inlet chamber 18. The housing is lined throughout with a thermal insulation 22, such as low density alumina. Penetrating the housing is a fuel inlet port 24, an air inlet port 25, within oxidant inlet chamber 18, and combustion product outlet port 28 leading hot exhaust gas 39 from combustion product chamber 16. The generator 10 is usually operated in a vertical position as shown.

The fuel cells 40 include a solid oxide electrolyte sandwiched between two ceramic electrodes supported on a porous ceramic support. Of significance in this design is the fact that the porous ceramic barriers 32 and 62 and the metal tube sheet 34, are not sealed structures. Smooth, round, ceramic, oxidant air conduits 20 are loosely supported at one end in the ceramic barrier 62 and tube sheet 34. As shown in FIG. 2, the tube sheet 34 has associated bores 60 that fit loosely about the conduits 20 to allow free thermal expansion. The conduits 20 are comprised of alumina, and the tube sheet is covered with an insulation 62 such as low density alumina. Leakage of oxidant, into the preheating chamber 16, as indicated by arrow 63 in FIG. 2, was considered acceptable, even though during actual operating conditions leakage of oxidant air constituted about 4 vol. % of the air feed 26. The conduits 20 extend from the tube sheet 34 into the open end 42 of the fuel cells 40.

It has been found that leakage of the feed oxidant air into the preheating chamber 16 can be detrimental to fuel cell generator performance. Such leakage lowers the temperature of combustion gas exhausted through outlet port 28 which would ordinarily be used in a heat recoupment device, lowers the preheating capability of generator chamber 14 and degrades the overall efficiency of the fuel cell generator system by about 4%. Additionally, it would be desirable to enhance the heat transfer to the feed air in the preheater-combustion product chamber 16, and in the generating or fuel cell region 14, and to provide a better scheme for discharge of combustion products. Improved heat transfer in these regions could result in a more compact preheater, and a more uniform operating temperature in the fuel cell region.

SUMMARY OF THE INVENTION

The above problems have been solved and the above needs met, generally, by providing a combination conducting, non-conducting means to feed or exhaust a gas into or from a high temperature electrochemcial apparatus. More specifically, such problems have been solved by providing an oxidant feed tube manifold or headering system composed of a plurality of easily fabricated, thermally and electrically conductive subheaders with insulating washer means separating each subheader, where each subheader feeds oxidant gas to thermally and electrically conductive, oxidant conduits, which are completely sealed against gas leakage into the preheating chamber of a fuel cell. Metal headering and conduit tubes are preferred. They are more ductile, have a greater resistance to thermal shock, have a higher thermal conductivity, and are easier to seal without fear of cracking than are ceramic tubes.

This gas ducting system will eliminate substantially all leakage of oxidant gas into the preheating space of a fuel cell, which can now be much more compact, and will provide a simpler, easier to manufacture means of exhausting the combustion products, ensuring better heating of incoming oxidant feed, which is preferably air. This gas communicating or connecting ducting system also provides more efficient operation of the generator, requires less oxidant pumping energy, and provides more heat exhaust for possible use in a bottoming cycle, such as a steam plant-turbine combination. Preferably, the oxidant air conduit will have a metal finned configuration to improve heat transfer even more, and to make the conduit self-centering within the fuel cell tubes. Related conduit concepts include a helical wire wrap and a twisted ribbon configuration.

Systems requirements that must be met to provide the manifold or headering system of this invention include: high thermal conductivity, thin wall subheaders and conduits; a service temperature maintained at 1000° C. or less; an oxidizing environment; a combination of metal and insulating components so that the headering system will not provide an electrical current path from one row of fuel cells to the next; control of differential thermal expansion between metal and insulating components so as to avoid misalignment between the oxidant air feed tubes and the fuel cells; and elimination of all oxidant air leakage into the preheating chamber. While the following description is directed to solid oxide fuel cells, the gas feeding or exhausting means of this invention can be utilized in other types of fuel cells and electrochemical apparatus, such as solid oxide electrolyzers.

BRIEF DESCRIPTION OF THE DRAWINGS

For a better understanding of the invention reference may be made to the preferred embodiments exemplary of the invention, shown in the accompanying drawings, in which.

DESCRIPTION OF THE PREFERRED EMBODIMENTS

Figure 3:
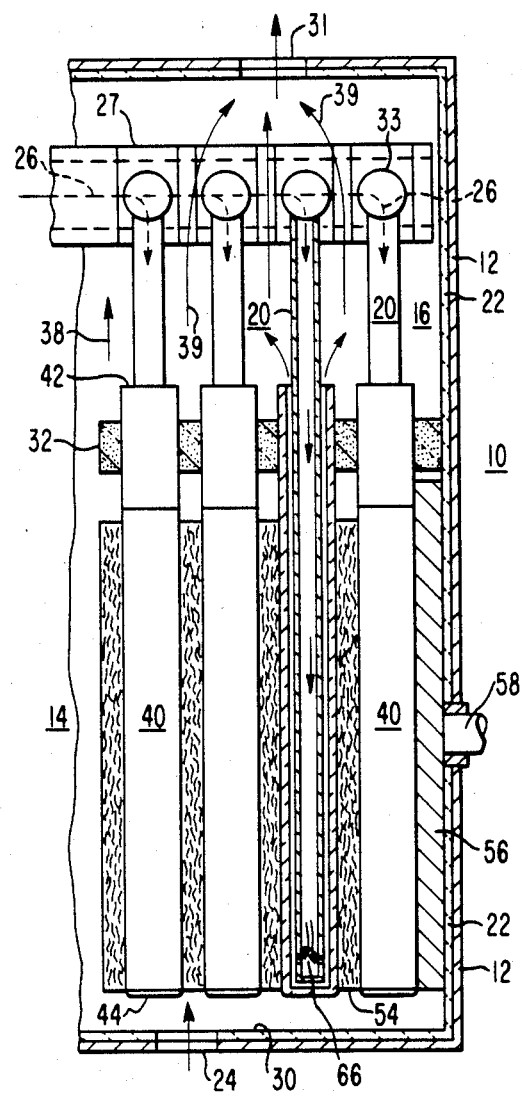
FIG. 3 is a view, partially in section of one embodiment of the generator design of this invention.

Referring now to FIG. 3 of the Drawings, which illustrates the compact electrochemical generator design of this invention, there is shown a fuel cell generator 10 including a gas-tight housing 12. The housing 12 surrounds a plurality of chambers, including a fuel inlet or generating chamber 14 and a combustion product or preheating chamber 16. The housing 12 is preferably comprised of steel, and lined throughout with a thermal insulation 22 such as low density alumina insulation. Penetrating the housing 12 and insulation 22 is a fuel inlet port 24, manifolding or headering oxidant gas inlet means 27 (entry through housing 12 not shown) for feeding oxidant such as air 26 into thermally and electrically conductive, thin walled conduits 20, and a combustion product outlet 31 for hot exhaust gas 39, as well as ports for electrical leads 58, connected to current collectors 56.

The generating chamber 14 extends between an end wall 30 of the housing 12 and a gas porous barrier 32. The preheating chamber 16 extends between the porous barrier 32 and combustion product outlet 31. As can be seen, when the conduits 20 are made of metal, improving heat transfer properties, the preheating chamber 16 can be made much more compact than the corresponding preheating chamber of FIG. 1, adding substantially to space utilization. While gas inlet means 27 is sealed, the porous barrier 32 need not be a sealed structure. The porous barrier 32, in particular, is designed to allow depleted fuel gas flow between the generating chamber 14, operating at an approximate pressure slightly above atmospheric, and the preheating chamber 16, operating at a slightly lower pressure, as indicated by arrow 38. The generator 10 is usually operated in a vertical position as shown.

High temperature, elongated, solid oxide electrolyte fuel cells 40 extend from the preheating chamber 16 into the generating chamber 14. The cells have open ends 42 in the preheating chamber 16, and closed ends 44 in the generating chamber 14. The fuel cells are preferably tubular, including a solid oxide electrolyte sandwiched between two electrodes, supported on a tubular porous support. The closed end 44 of the cell is generally electrochemically inactive, and can serve for final preheating of reactant fuel.

Each individual cell generates approximately one volt, and, in one embodiment, a plurality are electrically interconnected through conducting felt 54, preferably in a series-parallel rectangular array, as described elsewhere in this specification, and also in U.S. Pat. No. 4,395,468, which is herein incorporated by reference.

The oxidant air feed conduits 20 pass into the open end 42 of the electrochemical fuel cells 40, a single conduit 20 corresponding to a single fuel cell. Each conduit 20 extends the active length of the fuel cell, and preferably close to the closed end 44 of the cell, the conduit 20 being inserted close to, but spaced from, the closed end 44. Radial supports can be utilized to support each conduit 20 within the corresponding fuel cell 40. Each conduit is provided with a means for discharging a reactant medium into the fuel cell 40, such as openings 66 at the conduit end. The conduits can also be open ended and spaced from the end 44 of the fuel cell.

The porous barrier 32, which allows a throughput of depleted fuel, is preferably a porous ceramic baffle, such as one comprised of fibrous alumina felt, or ceramic plate segments with porous inserts such as ceramic wool plugs, surrounding each fuel cell 40.

During operation, an oxidant gas such as air enters the conduits 20, through inlet means 27, at a temperature of approximately 500° C. to 700° C., and a pressure above atmospheric, being initially heated prior to entering the housing by conventional means such as a heat exchanger coupled with a blower. The air flows into the conduits, through the preheating chamber 16, where it is further heated to a temperature of approximately 800° C. to 900° C. The air then flows through the length of the conduit, being further heated to approximately 1000° C., by virtue of absorbing most of the heat generated during the electrochemical reaction. A smaller fraction of the heat is absorbed by the fuel gas. The air is then discharged through the openings 66 into the fuel cell 40. The air within the fuel cell electrochemically reacts at the fuel cell cathode along the active length, depleting somewhat in oxygen content as it approaches the open end 42 of the cell. The depleted air is then discharged into the combustion product or preheating chamber 16.

A fuel, such as hydrogen or a mixture of carbon monoxide with hydrogen, flows from pumping and preheating apparatus into the generating chamber 14 through fuel inlet port 24. The fuel flows over and about the exterior of the fuel cells, electrochemically reacting at the fuel electrode. The fuel inlet port 24 is preferably located near the closed ends 44 of the cells 40. The fuel accordingly depletes as it approaches the porous barrier 32. The depleted fuel, containing approximately five percent to fifteen percent of its initial fuel content, then diffuses through the barrier 32 and into the preheating chamber 16 where it contacts the depleted air. In most instances, steam is fed into chamber 14 with the $H_2$ and CO fuel, which fuel is usually provided by reforming methane gas or the like.

Oxygen depleted air and fuel, directly react exothermally and combust, forming combustion products at a temperature of about 1000° C. to about 1100° C. The heat generated by this reaction, which results in the complete combustion of the fuel, along with the sensible heat of the depleted fuel and air, are utilized to preheat the incoming air. The combustion products are then discharged through combustion product outlet port 31, at a temperature of approximately 900° C.

Figure 4:
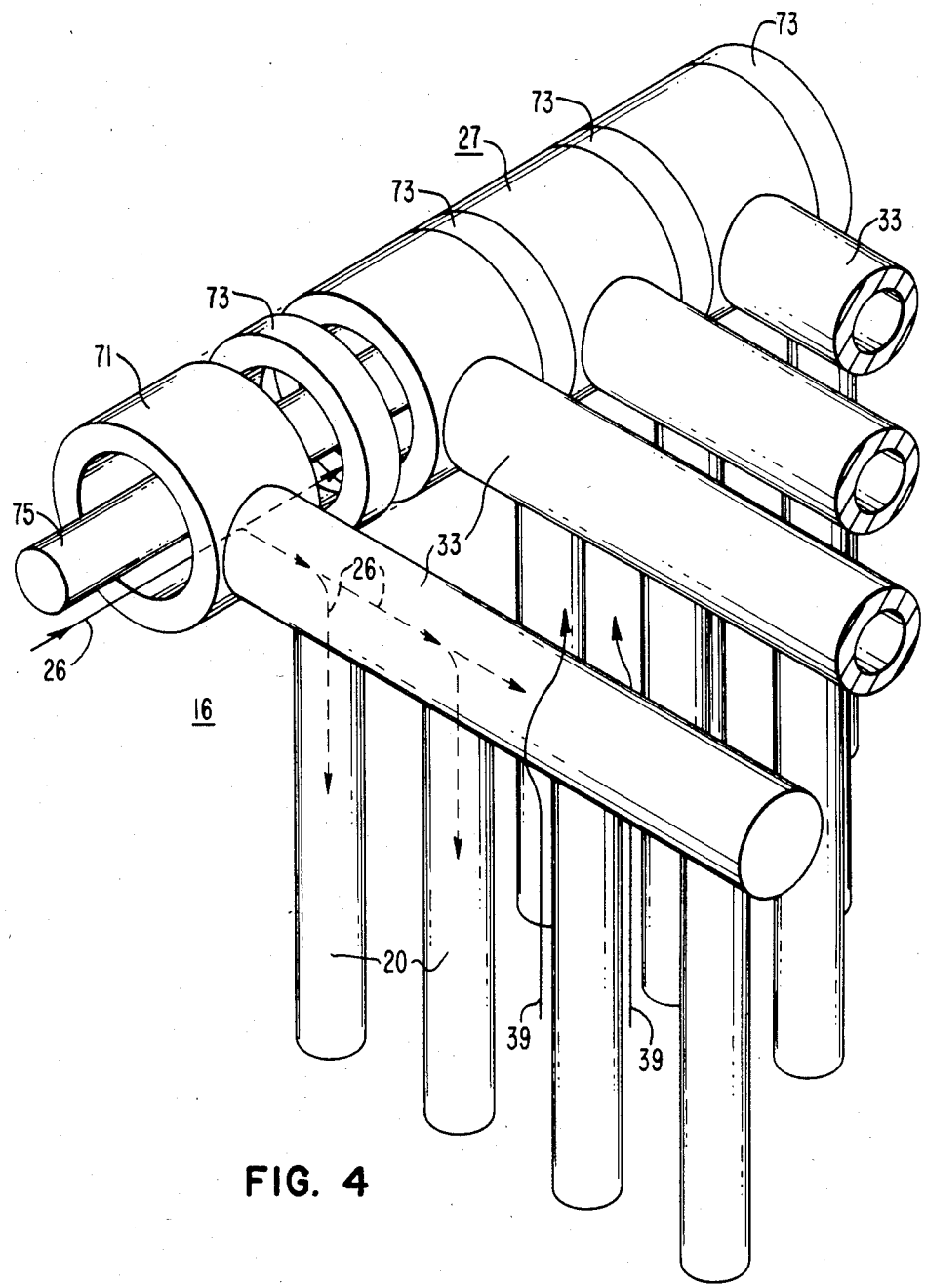
FIG. 4 is an exploded isometric view of one embodiment of the manifold and conduit ducting means to communicate gaseous material to an electrochemical system in accordance with this invention.

FIG. 4 illustrates in further detail the segmented, conducting, non-conducting gaseous communication or connection duct means of this invention, more specifically, a plurality of manifolding or headering oxidant inlet means 27, for feeding oxidant gas 26 such as air through associated subheader tubes 33 and into the associated conduits 20, with substantially no air leakage into the combustion product or preheating chamber 16. Each manifolding means 27 could serve subheader tubes 33 on one side, as shown in FIG. 4, or on both sides of the central manifolding means. Each subheader tube 33 could serve 5 to 10 conduits. The gas feed means contains a plurality of thermally and electrically conductive manifold or header segments or portions 71 of the manifolding means butted together with a compliant thermally and electrically insulating washer spacer means 73, preferably made of dense yet slightly compressible ceramic material, such as alumina, zirconia, or boron nitride fibers, separating each manifold or header portion 71. The washers are, preferably, compressible to about 85% of their original thickness.

The insulating separators 73 allow for thermal expansion and prevent an electrical current path from one row of fuel cells to the next. This is necessary because at generator operating temperatures of about 600° C. to 900° C., the inner fuel cell support tubes are electrically conducting, and the oxidant air conduit tubes 20 may contact the fuel cell support tubes. A continuous, all metal headering means would provide an electrical short. A continuous, all metal subheader 33 is not harmful. In the fuel cell generator described hereinbefore, fuel cells in one row are at the same potential, and therefore, it is not harmful to have these tubes electrically interconnected together by a solid metal subheader 33 which does not contain an insulator between the conduit connections to the subheader.

While oxidant air 26 is shown passing in one direction through the manifolding or headering means 27, for a long manifold, the air can be passed in through both ends of the manifold. The insulating washer 73 thickness can be kept to from about ⅛ inch to ½ inch to minimize thermal expansion problems and any misalignment between the conduits 20 and the fuel cells. Headering compression connecting means, such as some sort of metal tie rod 75 can pass through the center of the manifolding or headering assembly, and when sufficiently tightened or loaded, compress the dense ceramic felts 73 to provide a gas tight seal with essentially no oxidant leakage. The term "sealed" or "essentially no oxident leakage" is herein used, means less than about 0.1%; which is dramatically down from 4.0% in the prior art.

The individual oxidant air conduits 20 can be attached to the subheader tubes 33 by fusion welding at or about the melting point of the metal. This manifolding system eliminates the previously separated oxidant inlet chamber which was essentially insulated, and extends the combustion product or preheating chamber 16 to surround the manifolding oxidant inlet means 27, allowing more efficient heating of the oxidant air inlet feet 26 by circulating hot exhaust gas 39, as shown in FIG. 4.

The temperature of the manifolding or headering means, including subheader tubes and oxidant air conduit tubes, must be maintained preferably below 1000° C. This will be achieved by virtue of the efficient heat transfer of the metal components in transferring heat to the oxidant air feed, providing a cooling effect for the tubes. Oxidant air 26 will enter the headering system at from about 500° C. to 700° C., preferably at about 600° C. Combustion exhaust gases 39 passing over and around the metal headering, subheader, and conduit systems are at about 900° C. The heat transfer coefficient from the metal components to the oxidant air should be better than that from the combustion exhaust gases to the metal, therefore, the temperature of the metal components will be closer to 800° C. than 900° C.

With the use of a metal headering, subheadering and conduit system, it is essential that the environment is oxidizing rather than reducing. Use of an oxidizing atmosphere provides even cooling throughout the generator section 14, and allows a much wider selection of alloys for the metal portions of the gas ducting system. Since enough oxidant air is supplied to the fuel cell to provide a preferred stoichiometric ratio of air:fuel gas of over 3.5:1, the depleted air/vitiated fuel mixture 39 in the combustion or preheater region 16 is always rich in oxygen. The minimum air:fuel gas ratio would be about 2:1.

Metals useful for the manifolding or headering oxidant inlet means 27, subheader tubes 33, and conduits 20, include high nickel+chromium content alloys, such as: Inconel 600 alloy (containing 76.0% nickel, 8.0% iron, 15.5% chromium and 0.5% other elements) having a thermal conductivity of 16.08 Btu-ft./sq.ft-hr.-°F. at 1500° F. (815° C.), or 193 Btu-in./sq.ft.-hr.-°F. at 1500° F.; Inconel 690 alloy (containing 60.0% nickel, 9.5% iron, 30.0% chromium, 0.03% carbon and 0.47% other elements) having a thermal conductivity of 15.50 Btu-ft./sq.ft.-hr°F. at 1500° F. (815° C.); and Inconel 617 alloy (containing 52.0% nickel; 1.5% iron, 22.0% chromium, 12.5% cobalt, 9.0% molybdenum, 1.2% aluminum and 1.58% other elements) having a thermal conductivity of 14.90 Btu-ft./sq.ft.-hr.-°F. at 1500° F. (815° C/). All of these alloys have good to excellent high temperature oxidation resistance and high temperature strength and stability. Alumina ceramic tubes, used in the prior art, while having excellent high temperature properties, are thermal insulators having a thermal conductivity of about 0.6 Btu-ft./sq.ft.-hr.-°F. at 1500° F.

The alloys useful in the conduit construction should have thermal conductivity values over about 13 Btu-ft./sq.ft.-hr.-°F. Almost all oxidation resistant Inconel materials would be useful. Further details on these alloys can be found in Metal Progress, 1985 Materials and Processing Databook, Vol. 128, No. 1, mid-June 1985, pp. 60 to 62, herein incorporated by reference. High chromium and nickel stainless steel alloys would also be useful, such as Stainless Steels 253 MA (containing 11% nickel, 21% chromium, 66% iron, 1.7% silicon and 0.3% other elements), RA 333 (containing 35% nickel, 19% chromium, 43% iron, 1.25% silicon and 1.7% other elements), and the like. Metals such as aluminum or copper, of course, would be useless at the operating temperatures of the generator.

Figures 1, 2:
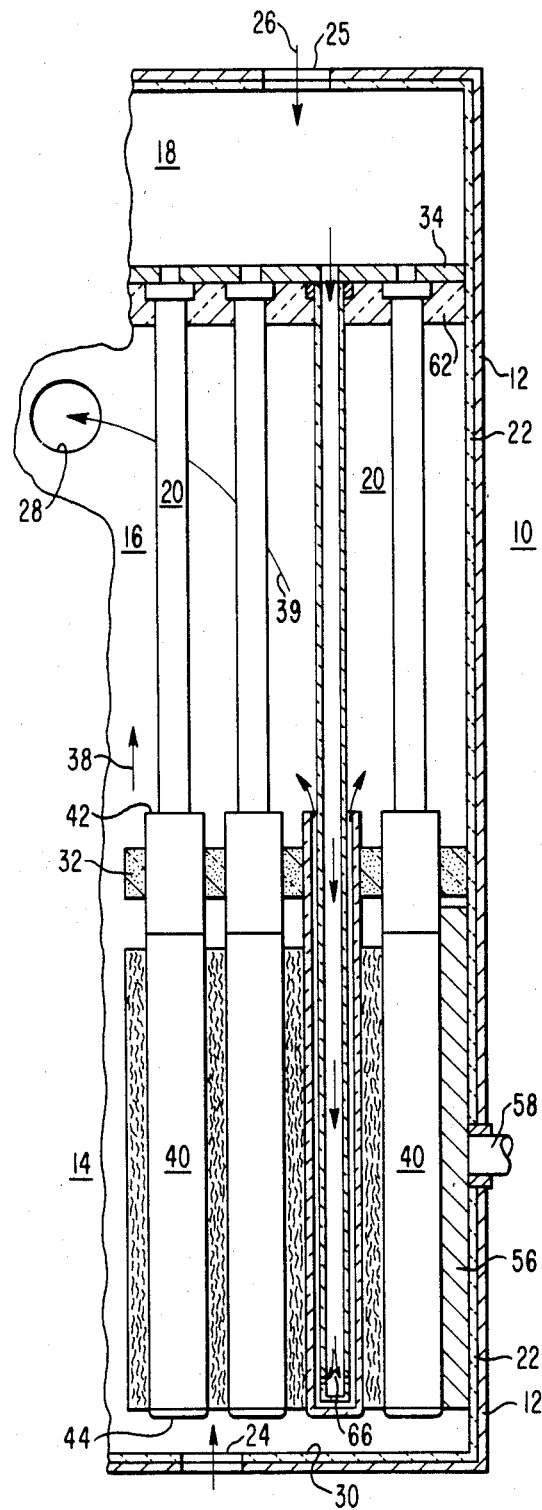
FIG. 1 is a view, partially in section of one prior art controlled gas leakage generator design.
FIG. 2 is a section view of one prior art controlled gas leakage design for supporting an oxidant air conduit in a tube sheet.
Figure 5:
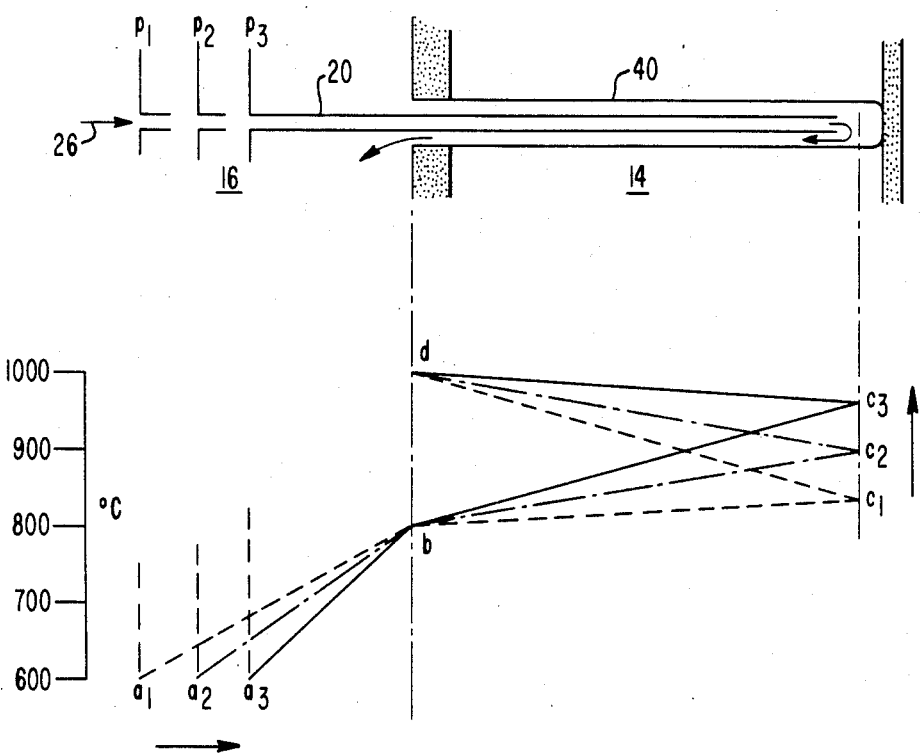
FIG. 5 is a pictorial graph of oxidant air temperature profiles for conduits having various thermal conductivities.

The importance of high thermal conductivity materials in reducing the preheater chamber 16 length, compare FIGS. 1 and 3, is shown in the oxidant air temperature profile of FIG. 5. From a to b is the preheating section 16 where heat is drawn from combustion product gases; b to c is further heating within the feed tube or generating section 14, where heat is drawn from air within the annulus between the conduit 20 and the fuel cell 40; and c to d is further heating within the annulus between the fuel cell support and the conduits, where heat is drawn from the fuel cell support tube wall and heat is released to air within the feed tube. Here $a_1$, $a_2$ and $a_3$ and columns $c_1$, $c_2$ and $c_3$ show increasing rates of heat transfer through the conduit tube.

The best system in FIG. 5 is the solid line $a_3$-b-$c_3$-d having the best heat transfer, resulting in the most compact preheater section $p_3$ and the most uniform fuel cell temperature. The worst system is the dashed line $a_1$-b-$c_1$-d which has the poorest heat transfer, resulting in the least compact preheater section $p_1$ and the least uniform fuel cell temperature.

Figure 6:
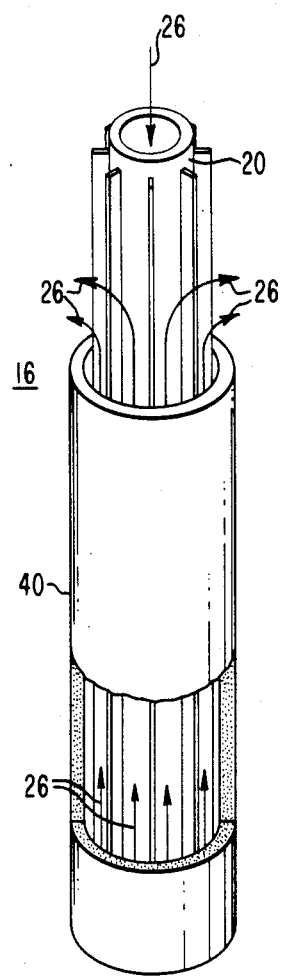
FIG. 6 is a pictorial view of an external finned, metal, oxidant air feed conduit.

Generally, the conduits 20 will have an outside diameter of from about 0.18 inch to 0.30 inch with a wall thickness of from about 0.010 inch to 0.020 inch. The subheader tubes 33 are about twice the diameter and wall thickness of the conduits 20. Well known techniques can be used to join the various conduit, subheader, and header segments of the manifolding means together. Preferably the conduits 20 will have an extending, exterior metal alloy straight or helical finned design as shown in FIG. 6, to improve heat transfer even more, especially in the preheater section 16, and to make the conduit self-centering within the fuel cell 40.

Figure 7:
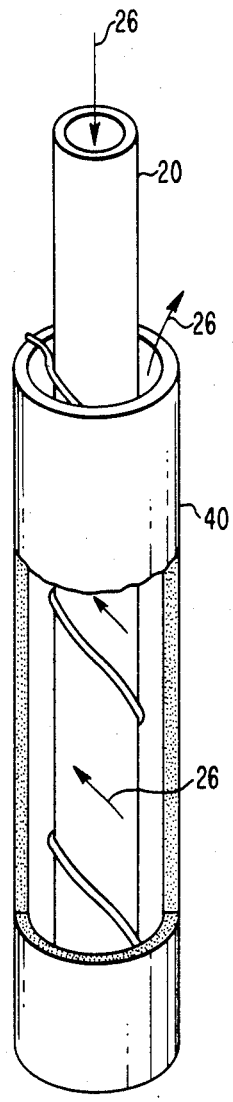
FIG. 7 is a pictorial view of an external, metal helical wire wrap, oxidant air feed conduit.
Figure 8:
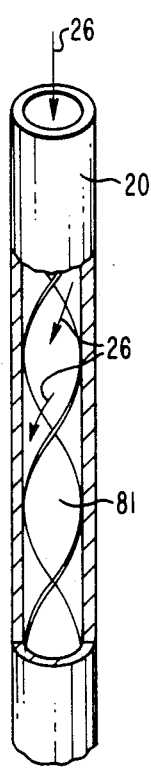
FIG. 8 is a pictorial view of an internal, metal ribbon design for an oxidant air feed conduit.

Related conduit concepts include: a high temperature metal alloy wire helical wire wrap, which causes a desirable turbulence in the air flow in the annulus between the conduit and fuel cell, and is shown in FIG. 7; and as shown in FIG. 8, a high temperature metal alloy twisted ribbon 81, disposed within the interior volume of the conduit 20, where a centrifugal force field results in the cooler oxidant air in the core of the flow being moved toward the wall and the hotter air at the wall moving toward the core with resulting desirable turbulence, as shown in FIG. 8.

Figure 9:
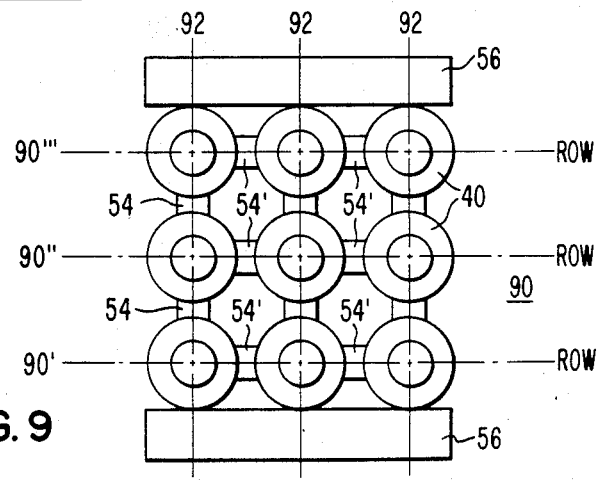
FIG. 9 is a schematic section view of a series-parallel interconnection configuration between fuel cells.

An advantageous fuel cell configuration which is provided by the elongated surface contact among adjacent annular cells is shown in FIG. 9. The cells 40 are here positioned in a series-parallel electrical connection array. For descriptive purposes, the arrangement includes rows 90 and 92. In the embodiment shown, the cells of any given row 90', 90'', 90''' are electrically interconnected in parallel through the outer electrodes and metal felt 54. Consecutive cells 40 along a column 92 are electrically interconnected in series, as shown in FIG. 9, from the inner electrode of one cell to the outer electrode of the next cell, through the metal felts contacting the outside of the cells. Thus, each cell in a row operates at substantially the same voltage, and voltage progressively changes among the cells of a column, typically varying by approximately one volt from cell-to-cell along a column. In this manner, any number of elongated cells can be interconnected to achieve a desired voltage and current output.

In this invention, it would be very beneficial if the conduits 20 of the subheaders 33 (see FIG. 4) provided electrical contact with the inside of each fuel cell, providing a good interconnection between the fuel cells in each row, the inner support of each fuel cell being conductive at operating temperatures, since the nicket felts 54' which provide parallel interconnection could be eliminated. Only the series row to row, i.e. between rows 90', 90'' and 90''', nickel felts would be required, and a greater fraction of the fuel electrode surface would contact the fuel.

Since numerous changes may be made in the above-described arrangements without departing from the spirit and scope thereof, it is intended that all matter contained in the foregoing be interpreted as illustrative, and not in a limiting sense.

We claim:

1. A gas ducting system for a plurality of electrochemical cells, said gas ducting system comprising at least one compressible insulating separator disposed between two thermally and electrically conducting manifolding gas means, the manifolding gas means comprising at least one hollow conduit attached to a hollow subheader, both communicating gas therethrough, where the subheader is attached to a manifold segment contacting the separator, and where the two manifolding gas means and insulating separator are compressed together by a compressing means to provide a sealed gas system communicating to the cells.

2. The gas feeder system of claim 1, where the manifolding gas inlet means are made of metal, and the insulating separator is ceramic material.

3. The gas feeder system of claim 1, where the conduits have extending exterior metal alloy fins.

4. The gas feeder system of claim 1, where the conduits have an exterior metal alloy helical wire wrapping.

5. The gas feeder system of claim 1, where the conduits have a metal alloy twisted ribbon disposed within the interior volume.

6. The gas feeder system of claim 2, where the conduits are made of an alloy containing nickel and chromium, having a thermal conductivity of over about 13 Btu-ft./sq.ft.-hr.-°F. at 1500° F., and the electrochemical cells are high temperature fuel cells.

7. The gas feeder system of claim 2, where the electrochemical cells are solid oxide electrolyte fuel cells arranged in a series-parallel electrical connection array, where the conduits contact the inside of the fuel cells providing parallel electrical interconnection.

8. The gas feeder system of claim 7, where the fuel cells and gas feeder system are disposed within a fuel cell generator operating at a temperature of between about 500° C. and 1100° C. with air being fed through the gas feeder system and into the interior of the fuel cells as oxidant, and fuel gas being fed into the generator to flow about the outside of the fuel cells, where the stoichiometric ratio of air:fuel gas is over 3.5:1, providing an oxidizing environment.

9. A fuel cell generator comprising a plurality of fuel cells, oxidant manifold feed means comprising alternating metal portions and insulating portions, the metal portions containing a plurality of elongated, metal, oxidant feed conduits, which conduits extend into each of said plurality of fuel cells, and means defining a preheating chamber and a fuel inlet generating chamber where the fuel cells are disposed within the fuel inlet generating chamber, where said oxidant feed conduits comprise a metal resistant to oxidizing gas and pass through the preheating chamber, and where oxidant gas is sealed within the manifold feed means and the oxidant feed conduits so that there is no oxidant entry into the preheating chamber before passage into the fuel cell.

10. The fuel cell generator of claim 9, where the fuel cells are of elongated tubular construction, comprise an inner electrode, an outer electrode and a solid oxide electrolyte between said electrodes and are arranged in a series-parallel electrical connection array with the metal conduits contacting the inside of the fuel cells providing parallel electrical interconnection, and where metal felts contact the outside of series connected fuel cells providing series electrical interconnection, where the fuel cell generator operates at a temperature of between about 500° C. and about 1100° C., and where the preheating chamber contains a mixture of depleted oxidant and depleted fuel gases.

11. The fuel cell generator of claim 9, where gaseous fuel enters the fuel inlet generating chamber, contacting the outside of the fuel cells where it is depleted, the oxidant is air which contacts the inside of the fuel cells where it is depleted, where the depleted fuel and air contact each other in the preheating chamber, and where the stoichiometric ratio of air:fuel is over 3.5:1 providing an oxidizing environment.

12. The fuel cell generator of claim 9, where the manifold feed means are made of a metal alloy, the insulating portion is a compressible ceramic material separator.

13. The fuel cell generator of claim 9, where the conduits have extending exterior metal alloy fins.

14. The fuel cell generator of claim 9, where the conduits have an exterior metal alloy helical wire wrapping.

15. The fuel cell generator of claim 9, where the conduits have a metal alloy twisted ribbon disposed within the interior volume.

16. The fuel cell generator of claim 12, where the conduits are made of an alloy containing nickel and chromium, having a thermal conductivity of over about 13 Btu-ft./sq.ft.-hr°F. at 1500° F.

17. A high temperature solid electrolyte fuel cell generator comprising:
 (1) a housing means defining a fuel inlet generating chamber and a preheating chamber;
 (2) a gas porous material separating said fuel inlet generating chamber and preheating chamber;
 (3) a plurality of elongated tubular fuel cells, each having an electrochemically active length, comprising an inner electrode, an outer electrode and a solid oxide electrolyte between said electrodes, disposed within said fuel inlet generating chamber;
 (4) oxidant manifold feed means, comprising alternating metal portions and insulating portions, the metal portions communicating with a plurality of metal, elongated, tubular oxidant feed conduits which extend into each of said plurality of fuel cells, providing a means for flowing oxidant gas into said fuel cells and into said preheating chamber, where said oxidant feed conduits are made of a metal alloy resistant to oxidizing gas; and
 (5) means for flowing a fuel gas into said fuel inlet generating chamber, about said fuel cells, and through said gas porous material into said preheating chamber;

where oxidant gas is sealed within the manifold feed means and the oxidant feed conduits so that there is no oxidant entry into the preheating chamber before passage into the fuel cells.

18. The fuel cell generator of claim 17, where the fuel cell generator operates at a temperature of between about 500° C. and about 1100° C., the oxidant is air, the stoichiometric ratio of air:fuel is over 3.5:1 providing an oxidizing environment, the fuel and air are depleted by contact with the fuel cell and the depleted fuel and air contact and mix with each other in the preheating chamber.

19. The fuel cell generator of claim 17, where the conduits are made of an alloy containing nickel and chromium alloy having a thermal conductivity of over about 13 Btu-ft./sq.ft.-hr.-°F. at 1500° F.

20. The fuel cell generator of claim 17, where the conduits have extending exterior metal alloy fins.

21. The fuel cell generator of claim 17, where the conduits have an exterior metal alloy helical wire wrapping.

22. The fuel cell generator of claim 17, where the conduits have a metal alloy twisted ribbon disposed within the interior volume.

23. The fuel cell generator of claim 17, where the fuel cells are arranged in a series-parallel electrical connection array with the metal conduits contacting the inside of the fuel cells providing parallel electrical interconnection and metal felts contacting the outside of series connected fuel cells providing series electrical interconnection.

* * * * *